United States Patent [19]

Nishiyama et al.

[11] Patent Number: 4,729,032

[45] Date of Patent: Mar. 1, 1988

[54] PICTURE RECORDING APPARATUS HAVING MEANS TO FACILITATE RASTER SCAN LINE OBSERVATION DURING VIDEO ADJUSTMENT

[75] Inventors: Mikio Nishiyama, Minami-Ashigara; Azuchi Endo, Ashigara-Kami, Japan

[73] Assignee: Fuji Photo Film Co., Ltd., Kanagawa, Japan

[21] Appl. No.: 754,491

[22] Filed: Jul. 12, 1985

[30] Foreign Application Priority Data

Jul. 13, 1984 [JP] Japan .................................. 59-145615

[51] Int. Cl.$^4$ .......................... H04N 5/84; H04N 3/223
[52] U.S. Cl. ..................................... 358/244; 358/180; 358/332; 358/22; 358/77
[58] Field of Search ................... 358/244, 244.1, 244.2, 358/111, 335, 332, 22, 180, 76, 77; 369/125

[56] References Cited

U.S. PATENT DOCUMENTS

| | | | |
|---|---|---|---|
| 4,096,530 | 6/1978 | Plugge et al. | 358/244 |
| 4,360,805 | 11/1982 | Andrews et al. | 358/244 |
| 4,482,919 | 11/1984 | Alston et al. | 358/244 |
| 4,528,585 | 7/1985 | Bolger | 358/22 |
| 4,547,708 | 10/1985 | Haferl | 358/180 |
| 4,575,766 | 3/1986 | Birnbaum et al. | 358/244 |
| 4,604,651 | 8/1986 | Frencken et al. | 358/180 |

OTHER PUBLICATIONS

Savon, "Zoom in Tight", Radio-Electronics pp. 34, 66–67, Dec. 1975.

Primary Examiner—Raymond F. Cardillo
Assistant Examiner—Robert A. Weinhardt
Attorney, Agent, or Firm—Sughrue, Mion, Zinn, Macpeak, and Seas

[57] ABSTRACT

A picture recording apparatus for recording as a hard copy such as a photography television image signals of a still picture reproduced on a display tube of a television monitor is disclosed. The apparatus comprises a device for reproducing television image signals of a still picture on a display screen of a television monitor as a picture, and a device for projecting the reproduced picture onto a recording medium, and circuitry for magnifiying a part of the reproduced picture on the screen in a vertical scanning direction and/or a horizontal scanning direction.

5 Claims, 15 Drawing Figures

PICTURE RECORDING APPARATUS HAVING MEANS TO FACILITATE RASTER SCAN LINE OBSERVATION DURING VIDEO ADJUSTMENT

BACKGROUND OF THE INVENTION

The present invention relates to a picture recording apparatus for producing photographic hard copies from television image signals of a still picture reproduced on a screen of a television monitor. More particularly, the present invention relates to a picture recording apparatus capable of magnifying a part of the reproduced picture in order to make analysis of reproduced picture or picture quality adjustment thereof easy.

In an X-ray diagnosis, ultrasonic diagnosis, computer tomography and radioisotope diagnosis, in general, there has generally been a trend toward obtaining recorded pictures by projecting images reproduced on a display screen of a television monitor onto a recording medium for example, a photographic film. One shortcoming with this approach is that the raster of such a monitor typically has scanning lines of 525 line/frame such that raster lines are remarkably visible on the recorded picture, resulting in a difficulty in observing the recorded picture. The conventional picture recording apparatus, therefore, typically employs means for reproducing images in such a fashion that raster lines of the reproduced image displayed on the screen are not remarkably visible, for example, by using pseudo interlacing or raster erasing.

In one example shown in Japanese Patent Application Publication No. 57025/83, there was proposed a raster erasing method in which image signals of a plurality of same rasters are reproduced on a screen of a display tube in the vertical scanning direction and so as to adjoin rasters of a respective frame. This raster shifting and multiplication is; equivalent to the case of increasing the number of lines of the reproduced image. Another raster erasing method, in which intervals between rasters adjacent to the picture of the same frame are made invisible, by making the scanning beam width of the display tube wide or by adding wobbling. The picture recording apparatus using one of the above described raster erasing methods is effective in making the presence of raster line invisible on the recorded picture obtained as a hard copy. One shortcoming, resulting from the raster approaches, is that it is impossible to observe the raster reproduced on the display tube of the television monitor with the naked eye. As such it is difficult to observe whether the raster lines are inserted with equal interval, resulting in a problem of being incapable of observing whether images reproduced on the display tube are adjusted with high precision.

The above conventional picture recording apparatus is not easy to handle. First, no provision is made for supplying means for adjusting respective portions of the image reproducing system in the picture recording apparatus with precision. More particularly, no provision is made for supplying observing means for analyzing a part of the reproduced image by magnifying the part thereof in any direction, while viewing images reproduced on the display tube of the television monitor.

SUMMARY OF THE INVENTION

It is an object of the present invention to overcome the above described disadvantages of the conventional picture recording apparatus.

It is another object of the present invention to provide a picture recording apparatus having means for observing the image with ease during adjustment or analysis of images reproduced on a display tube of a television monitor.

According to the present invention there is provided a picture recording apparatus comprising means for reproducing television image signals of a still picture on a display screen of a television monitor as a picture, and means for projecting the reproduced picture onto a recording medium, and means for magnifying a part of the reproduced picture on the screen in a vertical scanning direction and/or a horizontal scanning direction.

Television image signals of the still picture are reproduced on the screen of the television monitor as a picture, by reproducing the image signals a plurality of times while shifting the reproducing position of the image. The picture recording apparatus further comprises means for adjusting a raster interval.

DESCRIPTION OF THE PREFERRED EMBODIMENT

Figure 1:
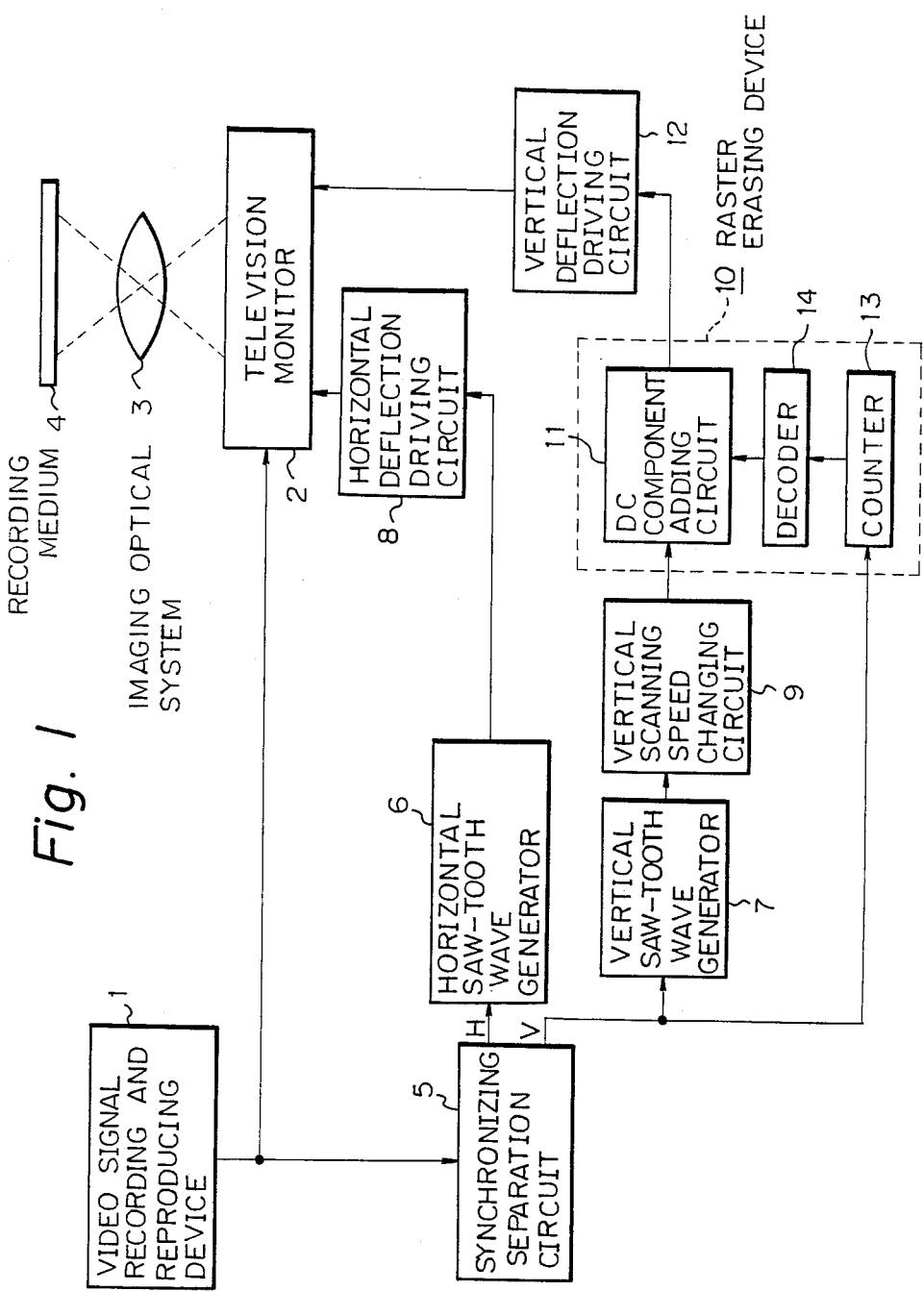
FIG. 1 is a block diagram showing one embodiment of a picture recording apparatus according to the present invention.

Referring now to FIG. 1, there is shown one embodiment of a picture recording apparatus according to the present invention.

The picture recording apparatus comprises a video signal recording and reproducing device 1 which records video signals obtained by host video generating devices, for examle, X-ray images with an X-ray CRT device (not shown). In this embodiment, television signals, obtained by repeatedly reproducing the same frame signal from the video signal recording and reproducing device 1, are reproduced on a display tube of a television monitor 2. The reproduced images are then projected and recorded onto a recording medium 4, such as a photographic film, through an imaging optical system 3.

The composite television signals, reproduced by the video signal recording and reproducing device 1, are supplied to: the monitor 2; a video signal processing system; and a synchronizing separation circuit 5, respectively. The video signals supplied to the monitor 2 modulate electron beams in the display tube through a video circuit of the monitor. The synchronizing separation circuit 5, separates synchronizing signals, thereby deriving horizontal synchronizing signals H and vertical synchronizing signals V. These horizontal synchronizing signals H and vertical synchronizing signals V are supplied to a horizontal saw-tooth wave generator 6 and a vertical saw-tooth wave generator 7, respectively. Respective saw-tooth waveforms are thereby generated in synchronism with the synchronizing signals H and V, respectively. In this embodiment, the picture recording apparatus comprises means for magnifying a part of images reproduced in the monitor 2 only in the vertical scanning direction. To this end, the horizontal saw-tooth wave signals from the generator 6 are directly supplied to a horizontal deflection driving circuit 8, in the same manner as the conventional devices, to drive a horizontal deflection system for the display tube of the monitor 2.

In contrast, deformed vertical saw-tooth wave signals from the generator 7 are supplied to a vertical deflection driving circuit 12 by precessing them into a non-linear waveform. This is accomplished with a vertical scanning speed changing circuit 9 and by adding step wave direct current components at a plurality of frame periods. As a result of the latter, there is one frame period being shifted and multiplied by adding one step with a DC current adding circuit 11, which constitutes a raster erasing device 10.

The raster erasing device 10 comprises a binary counter 13 for counting the vertical synchronizing signals V supplied from the synchronizing separating circuit 5. Also included is a decoder 14 for decoding the counted values of the counter 13, so as to change-over and set the added DC components of the DC component adding circuit 11 in correspondence with the counted values of the counter 13. Finally, there is included the DC component adding circuit 11.

When reproduced images of same picture in n frames are repeatedly reproduced on the display tube of the monitor 2 so as to adjoin same numbered raster of respective reproduced images sequentially, photographic image improvement is thereby obtained using a multiplied raster erasing effect. This is facilitated by the raster erasing device 10, where in past, the vertical synchronizing signals are counted by the counter 13 which have repeat periods of n figure equal to frame number n. In correspondence with the respect periods the DC component adding circuit 11 superimposes the DC components according to the output of the counter, onto the linear or non-linear saw-tooth wave signals from the vertical scanning speed changing circuit 9. In this case, it is sufficient for the added DC component to use a current having 1/n of that necessary to deflect one raster line of the reproduced image in the vertical scanning direction. As a result vertical deflection system, the DC components vertical deflection system of the are changed at a frame period every n frame periods so that a plurality of reproduced images are sequentially reproduced with adjacent rasters, thereby obtaining a reproduced image with invisible raster. In addition to raster multiplication, the vertical deflection signals can be processed by the present invention into high scanning speed signals so that the portion of the reproduced image corresponding to the high speed scanning portion represents the magnified portion of the image in the vertical scanning direction. This magnification feature can be enabled according to demand, so that under usual conditions, the reproduced images having dense and invisible raster are obtained on the display tube of the monitor, projected on the recording medium and recorded thereon.

Figure 2A:
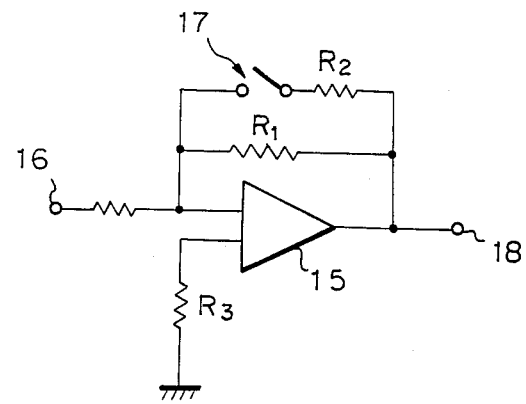
FIGS. 2A and 2B are circuit diagrams showing a scanning speed changing circuit and a scanning speed changing circuit with positional adjustment capabilities, respectively.

FIG. 2A shows an embodiment of a circuit construction of the vertical scanning speed changing circuit. In this embodiment, the circuit comprises an operation amplifier 15 having a feed back resistor R connected between one input terminal 16 and an output terminal 18 thereof. The value of the feed back resistor is set to obtain a relation of $1/R = 1/R_1 + 1/R_2$ so that the vertical saw-tooth wave signals supplied from the input terminal 16 can be linearly amplified under the usual condition of recording. That is, the feed back resistor R comprises a parallel combination of resistors $R_1$ and $R_2$ and the resistor $R_2$ is connected to a switch 17 in series. The other input terminal of the amplifier 15 is connected to an earth through a resistor $R_3$. When a part of the reproduced image must be magnified in the vertical scanning direction, the switch 17 is selected to an OFF state to deform the vertical saw-tooth wave signal in the non-linear form, thereby delivering from the output terminal 18 a part of the vertical saw-tooth wave as a high speed scanning signal. In order to obtain the usual reproduced image, the switch 17 can be selected to an ON state and in order to magnify a part of the reproduced image the switch 17 can be selected to an OFF state resulting in a feed back resistor having a value $R_1$. This decreases the amount of negative feed back, and thus, the gain of the operational amplifier 15 becomes increased so that the vertical saw-tooth wave signals in the range corresponding to the center portion of the image can be obtained.

Figure 2B:
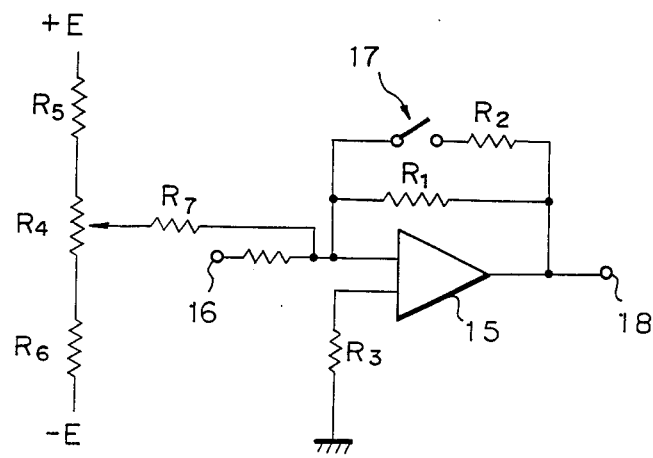

FIG. 2B shows another embodiment of the vertical scanning speed changing circuit 9. In this embodiment, a voltage going in the positive or negative direction is superimposed on the vertical saw-tooth wave signal supplied from the input terminal 16 so that not only the center portion, but also any peripheral portion of the picture can be magnified by changing the value of the positive or negative going voltage. In FIG. 2B, same elements or portions are designated by same reference characters as those in FIG. 2A. In this embodiment, use is made of a voltage divider comprising a series combination of a variable resistor $R_4$ and fixed resistors $R_5$ and $R_6$, as well as a variable pointing resistor $R_7$ which is connected to the first input terminal. The construction of the operational amplifier 15 is same as that of the amplifier shown in FIG. 2A. According to this embodiment the magnified position can be changed by changing the value of the variable resistor $R_4$.

During a usual picture recording mode signals composed of the DC component superimposed on the non-linear vertical saw-tooth wave signal successively are supplied to the vertical deflection driving circuit 12. In response, the reproduced images of n frames are reproduced on the display tube of the television monitor 2 so as to arrange rasters of successive reproduced image between rasters of the first reproduced images side by side, thereby visually obtaining the reproduced image having invisible raster. Therefore, recorded pictures having invisible raster can be obtained by projecting and recording a plurality of reproduced images on the recording medium.

In order to observe whether rasters of a plurality of images reproduced on the display tube are adjusted at equal intervals, the switch 17 of the vertical scanning speed changing circuit 9 is selected to an OFF state. This OFF position of the switch deforms a part of the vertical saw-tooth wave signals supplied to the vertical deflection driving circuit 12, into a high speed scanning signal so that the image range of the reproduced images corresponding to the high speed scanning signal is magnified. The raster interval which was previously indiscriminate with the naked eye, becomes large so that the raster can be discriminated. A user can then effect adjustment by observing the arranged condition of the raster with ease, thus resulting in an easy adjustment of positional relation between the rasters and in an easy analysis of picture quality of.

The above embodiment shows the construction capable of magnifying the reproduced images only in the vertical scanning direction. The scope of the present invention also includes an embodiment wherein the reproduced images can be magnified in the horizontal scanning direction. In this case, a horizontal scanning speed changing circuit having same construction as that of the vertical scanning speed changing circuit 9 shown in FIG. 2 may be inserted between the horizontal saw-tooth wave generator 6 and the horizontal deflection driving circuit 8. It is also found that the reproduced images may be magnified in the horizontal and the vertical scanning directions.

Figure 3A:
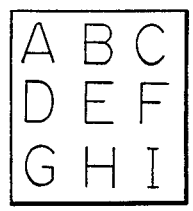
FIG. 3A is a plan view showing images reproduced by the apparatus according to the present invention in a normal mode of operation.
Figure 3B:
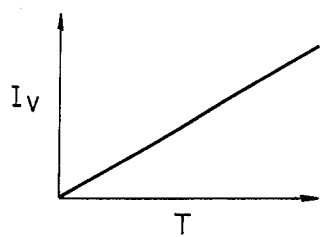
FIGS. 3B and 3C are waveform charts showing horizontal and vertical deflection currents for the images shown in FIG. 3A.
Figure 3C:
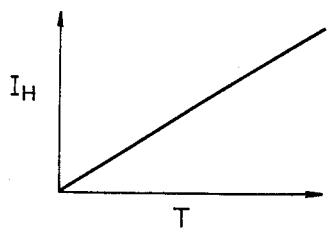
Figure 4A:
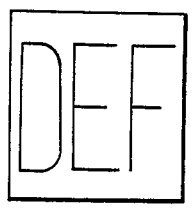
FIG. 4A is a plan view, of a portion of the reproduced image of FIG. 3A, after having been subjected to a vertical enlargement by the present invention.
Figure 4B:
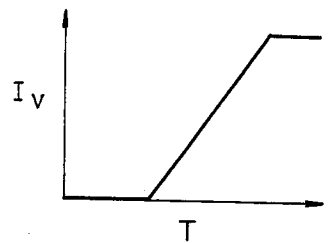
FIGS. 4B and 4C are waveform charts showing horizontal and vertical deflection currents for the images shown in FIG. 4A.
Figure 4C:
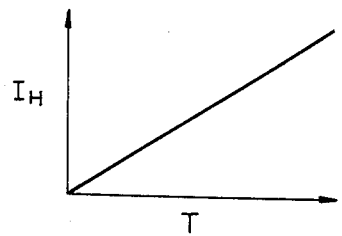
Figure 5A:
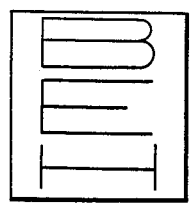
FIG. 5A is a plan view, of a portion of the reproduced image of FIG. 3A, after having been subjected to a horizontal enlargement by the present invention.
Figure 5B:
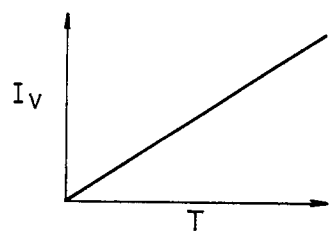
FIGS. 5B and 5C are waveform charts showing the horizontal and vertical deflection currents for the images shown in FIG. 5A.
Figure 5C:
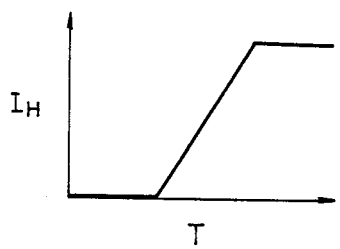
Figure 6A:
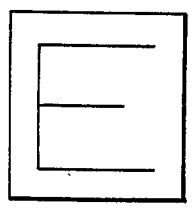
FIG. 6A is a plan view of a portion of the reproduced image of FIG. 3A, after having been subjected to both a vertical and horizontal enlargement by the present invention.
Figure 6B:
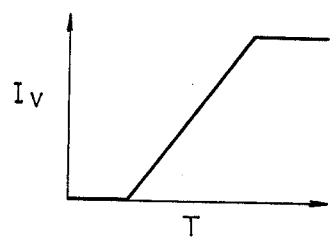
FIGS. 6B and 6C are waveform charts showing the horizontal and vertical deflection currents for the image shown in FIG. 6A.
Figure 6C:
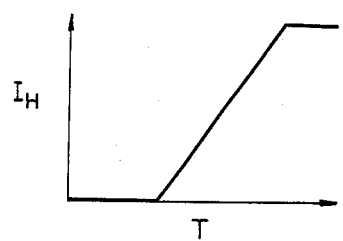

This is accomplished by inserting the circuits of the present invention into both the vertical and horizontal scanning circuits. In order to analyze the image by the apparatus according to the present invention, the vertical scanning speed changing circuit 9 or the horizontal scanning speed changing circuit must be constructed to move the high speed scanning portion to any position for the time base direction, thereby obtaining a selective magnification for optical portion of the reproduced image. FIGS. 3A to 3C through FIGS. 6A to 6C show different magnified results of the reproduced image by the apparatus according to the present invention and the conditions of wave shapes of the vertical deflection current $I_V$ and the horizontal deflection current $I_H$ to the time T plotted on the abscissa. In particular, FIG. 3A shows the reproduced image obtained under usual condition. FIG. 4A shows the partially enlarged image obtained in case of reproducing images as the high speed scanning signal. FIG. 5A shows the partially enlarged images obtained in case of deforming the horizontal deflection current $I_H$ non-linear as shown in FIGS. 5B and 5C. FIG. 6A shows the enlarged images obtained in case of making the vertical deflection current $I_V$ and the horizontal deflection current $I_H$ non-linear as shown in FIGS. 6B and 6C. In each illustrated case, FIGS. 3B, 3C, 4B, 4C, 5B, 5C and 6B, 6C show the vertical deflection current $I_V$ and the horizontal deflection current $I_H$, respectively.

What is claimed is:

1. A picture recording apparatus having means for reproducing a video image on a display screen of a television monitor in response to image signals, and means for projecting the reproduced video signal onto a recording medium, the improvement wherein:

said means for reproducing a video image comprises:
  raster scanning means for producing raster scanning signals to be applied to electron beam deflection coils of said television monitor, such that said reproduced video image is composed of a plurality of raster scan lines;
  said raster scanning lines being selectable in an image reproduction mode wherein adjacent raster scan lines of said reproduced image are substantially indiscriminate from one another in a visual sense; and,
  said raster scanning means also being selectable in a video adjustment mode such that a portion of said reproduced video image is displayed on said television monitor having increased spacing between adjacent raster scan lines in comparison to the spacing between adjacent raster scan lines when said raster scanning means is selected in said image reproduction mode, said increased spacing being to facilitate visual observation of discrete raster scan lines during video adjustment;
wherein said raster scanning means comprises:
  amplifier means having an input terminal and an output terminal;
  first feedback means comprising a first resistor connected in series between said input terminal and said output terminal; and
  second feedback means comprising a second resistor and switch means connected in series between said input terminal and said output terminal, wherein said switch means, selected to a short circuit mode for a feedback path comprised of a parallel combination of said first and second resistors, represents said raster scanning means selected in an image reproduction mode, and wherein said switch means, selected to an open circuit mode for a feedback path comprised of a series connection of the first resistor only, represents said raster scanning means selected in a video adjustment mode.

2. A picture recording apparatus as claimed in claim 1, where said raster scanning means is in a horizontal scanning circuit of said means for reproducing a video image.

3. A picture recording apparatus as claimed in claim 1, wherein said raster scanning means is in a vertical scanning circuit of said means for reproducing a video image.

4. A picture recording apparatus as claimed in claim 1, wherein separate said raster scanning means are included in each of a vertical scanning circuit and a horizontal scanning circuit of said means for reproducing a video image.

5. A picture recording apparatus as claimed in claim 1, wherein said raster scanning means further comprises:

positional adjustment means for applying an adjustable DC voltage level to the input terminal of said amplifier means to facilitate positional adjustment to the portion of the video image which is desired to be displayed during said video adjustment mode.

* * * * *